(12) United States Patent
Madden

(10) Patent No.: US 8,829,347 B2
(45) Date of Patent: Sep. 9, 2014

(54) POWER UMBILICAL

(75) Inventor: Dave Madden, League City, TX (US)

(73) Assignee: Technip France (FR)

( * ) Notice: Subject to any disclaimer, the term of this patent is extended or adjusted under 35 U.S.C. 154(b) by 716 days.

(21) Appl. No.: 12/995,207

(22) PCT Filed: May 29, 2009

(86) PCT No.: PCT/US2009/003285
§ 371 (c)(1),
(2), (4) Date: Feb. 11, 2011

(87) PCT Pub. No.: WO2009/145906
PCT Pub. Date: Dec. 3, 2009

(65) Prior Publication Data
US 2011/0147047 A1      Jun. 23, 2011

Related U.S. Application Data

(60) Provisional application No. 61/057,543, filed on May 30, 2008.

(51) Int. Cl.
*H01R 9/05*  (2006.01)
*F16L 9/19*  (2006.01)
*E21B 33/038*  (2006.01)

(52) U.S. Cl.
CPC ............... *F16L 9/19* (2013.01); *E21B 33/0385* (2013.01)
USPC ............................ 174/74 R; 174/78; 174/79

(58) Field of Classification Search
USPC ...... 174/110 R, 113 R, 113 C, 115, 74 R, 78, 174/79, 650–655
See application file for complete search history.

(56) References Cited

U.S. PATENT DOCUMENTS

| | | | | |
|---|---|---|---|---|
| 4,196,307 A | * | 4/1980 | Moore et al. | 174/47 |
| 4,653,776 A | * | 3/1987 | Borg | 285/2 |
| 5,183,966 A | * | 2/1993 | Hurtado et al. | 174/20 |
| 5,813,106 A | * | 9/1998 | Haug et al. | 29/429 |
| 5,902,958 A | * | 5/1999 | Haxton | 174/47 |
| 6,046,404 A | * | 4/2000 | Figenschou et al. | 174/47 |
| 6,146,052 A | * | 11/2000 | Jacobsen et al. | 405/169 |
| 6,742,813 B1 | * | 6/2004 | Glejbol | 285/222.1 |
| 6,943,300 B2 | * | 9/2005 | Ekeberg et al. | 174/113 R |
| 7,158,703 B2 | * | 1/2007 | Mjelstad | 385/101 |
| 7,473,844 B2 | * | 1/2009 | Figenschou et al. | 174/47 |
| 2004/0134662 A1 | * | 7/2004 | Chitwood et al. | 166/367 |
| 2010/0196696 A1 | * | 8/2010 | Grayson et al. | 428/323 |

FOREIGN PATENT DOCUMENTS

| | | | | | |
|---|---|---|---|---|---|
| DE | 661604 | * | 6/1938 | | F16L 11/12 |
| EP | 1691377 A2 | * | 8/2006 | | H01B 9/00 |

* cited by examiner

*Primary Examiner* — William H Mayo, III
(74) *Attorney, Agent, or Firm* — Ostrolenk Faber LLP

(57) ABSTRACT

An umbilical for deep water applications, which includes a plurality of power cables and other elements bundled together within a sheath. The umbilical further includes an end termination at some or all of the power cables, the termination including a resin ferrule disposed around the cable to provide a connection between the cable and an installation to which the umbilical is connected.

12 Claims, 6 Drawing Sheets

POWER UMBILICAL

CROSS REFERENCE TO RELATED APPLICATIONS

The present application is a 35 U.S.C. §371 National Phase conversion of PCT/US2009/003285, filed May 29, 2009, which claims benefit of U.S. Provisional Application No. 61/057,543, filed May 30, 2008, the disclosure of which is incorporated herein by reference. The PCT International Application was published in the English language.

BACKGROUND OF THE INVENTION

The present invention relates to an umbilical for use in the offshore production of hydrocarbons, and in particular to a power umbilical for use in deep water applications.

An umbilical consists of a group of one or more types of elongated active umbilical elements, such as electrical cables, optical fiber cables, steel pipes and/or hoses, cabled together for flexibility, over-sheathed and, when applicable, armored for mechanical strength. Umbilicals are typically used for transmitting power, signals and fluids (for example for fluid injection, hydraulic power, gas release, etc.) to and from a subsea installation.

The umbilical cross-section is generally circular. The elongated elements of the umbilical are wound together either in a helical or in a S/Z pattern. In order to fill the interstitial voids between the various umbilical elements and obtain the desired configuration for the umbilical, filler components may be included within the voids.

ISO 13628-5/API (American Petroleum Institute) 17E "Specification for Subsea Umbilicals", provides standards for the design and manufacture of such umbilicals.

Subsea umbilicals are installed at increasing water depths, commonly deeper than 2000 m. Such umbilicals have to be able to withstand severe loading conditions during their installation and their service life.

The main load bearing components in use for withstanding the axial loads due to the weight and to the movements of the umbilical are steel pipes (see U.S. Pat. No. 6,472,614, WO93/17176 and GB2316990), steel rods (see U.S. Pat. No. 6,472,614), composite rods (see WO2005/124213), tensile armor layers (see FIG. 1 of U.S. Pat. No. 6,472,614), or steel wire ropes.

The other elements of and in the umbilical, i.e. the electrical and optical cables, the thermoplastic hoses, the polymeric external sheath and the polymeric filler components do not contribute significantly to the tensile strength of the umbilical.

Electrical cables used in subsea umbilicals fall into two distinct categories respectively known as power cables and signal cables. Power cables are used for transmitting high electrical power (typically a few MW) to powerful subsea equipments such as pumps. Power cables are rated at voltages comprised between 1 kV and 200 kV, and generally between 6 kV and 35 kV (medium voltage range).

Signal cables are generally used for transmitting signals and low power (<1 kW) to electrical devices on the seabed. Signal cables are generally rated at a voltage smaller than 3000V, and typically smaller than 1000V.

The copper conductors of electrical cables are not load bearing components, because of the low tensile strength of copper. These copper conductors effectively add weight only to the umbilical. Unless protected, these electrical conductors may therefore be damaged by excessive elongation or crushing especially under severe conditions such as in deep water.

An object of the present invention is to solve this problem and provide a light weight/high strength umbilical comprising electrical power cables which can be used in deep water applications.

SUMMARY OF THE INVENTION

The invention concerns a hang-off termination of an umbilical comprising at least one power cable. The power cable comprises a high tensile strength electrical conductor. The power cable conductor of the present invention has two functions, namely transmitting electrical power and partially withstanding the tensile load applied to the umbilical. Umbilicals comprising power cable conductors combining these two functions are not known.

One aspect of the invention is to replace the copper conductors of the power cables by conductors made of a high strength material, for example high strength aluminum grades, metal matrix composites, or carbon fiber composite reinforced conductors. Such conductors are used for overhead power transmission (see U.S. Pat. No. 6,180,232) and are strong and light enough to be able to withstand their own suspended weight in water. Furthermore, these conductors can be used as load bearing elements which partially withstand the tensile loads applied to the umbilical. This solution decreases the tensile loads applied to the other load carrying components (steel pipes, steel or composite ropes, steel or composite rods, steel or composite armors), and therefore increases the tensile strength of the umbilical and/or makes it possible to reduce its weight by removal of some of the other load carrying elements.

The tensile loads applied to an umbilical riser extending from the sea bed up to a host vessel/platform are maximum at the topside termination area (hang-off termination). The deeper is the water, the longer and heavier is the umbilical riser, and the greater is the top side tensile load. Therefore, for deep water, it is advantageous to utilize the tensile strength of such high strength conductors on their own or in combination with the other tensile strength components (armors, rods or tubes) contained in the umbilical.

In the present specification, a core is defined as an insulated conductor. Sometimes a cable can be considered to be a collection of insulated conductors (cores) or an insulated and screened conductor. The invention applies to any kinds and shapes of high strength conductor materials including metals, metal combinations, high strength alloys and all composites, metallic and/or non metallic. It also applies to all conductor types which may be shaped, stranded, circular, solid, or composite including some or all of the above.

The second aspect of the invention is that when a high strength power core and/or cable is included in an umbilical, it is advantageous to mechanically connect the high strength conductor to the end termination of the umbilical, i.e. in the event of load share or self support of the cable/core. This is a means whereby the tensile strength of the conductor can be mechanically coupled to the end termination, while it is also electrically isolated from earth or ground potential.

The primary hang-off termination for an umbilical may include the terminations of armors, tubes and/or other tensile strength elements. Within the primary hang-off, it is not expected that the resin encapsulation of the cable sheath or jacket will be sufficient (especially over time) to support the loading of the cable. It is expected however that the arrangement and separation of power cables/cores can be maintained, and the loading transferred to the 'secondary' hang-off position, which is the focus of this aspect of the invention.

This invention is intended to apply mainly to the host vessel/platform end of an umbilical system, but it can equally apply to part of a subsea umbilical termination. This system can be used in conjunction with armored or unarmored umbilicals.

The invention uses the principle of an insulated retention collar in the form of a special 'shaped ferrule', cast into a resin conglomerate which has high compressive strength, and good electrical insulating properties. This ferrule, when attached to the conductor, and cast into the resin, will offer a supporting system for the power cable. The tensile stress withstood by the high strength conductor of the power cable is transmitted to the hang-off termination body through the ferrule and the resin. The ferrule profile is designed to consider the mechanical forces exerted upon it as well as the electrical corona.

Methods of attaching the conductor to the ferrule can be numerous and may include crimping, swaging, welding, soldering, brazing, CAD welding, bonding (using a conductive adhesive) or a basket socket with a conducting wedge(s).

Connection of the conductor to the ferrule requires the conductor insulation to be re-instated on one side (i.e. inboard towards the umbilical cable/core). On the outboard side, the conductor insulation can also be re-instated, or alternatively it may be designed to suit a custom termination which can be connected to commercially available accessories or equipment.

Other features and advantages of the present invention will become apparent from the following description of the invention which refers to the accompanying drawings.

DESCRIPTION OF CABLES AND OF A PREFERRED EMBODIMENT OF THE INVENTION

Figure 1A:
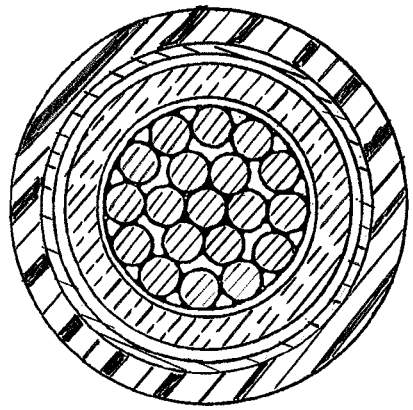
FIG. 1 is a perspective view and FIG. 1a is an end view of a known power cable.
Figure 1:
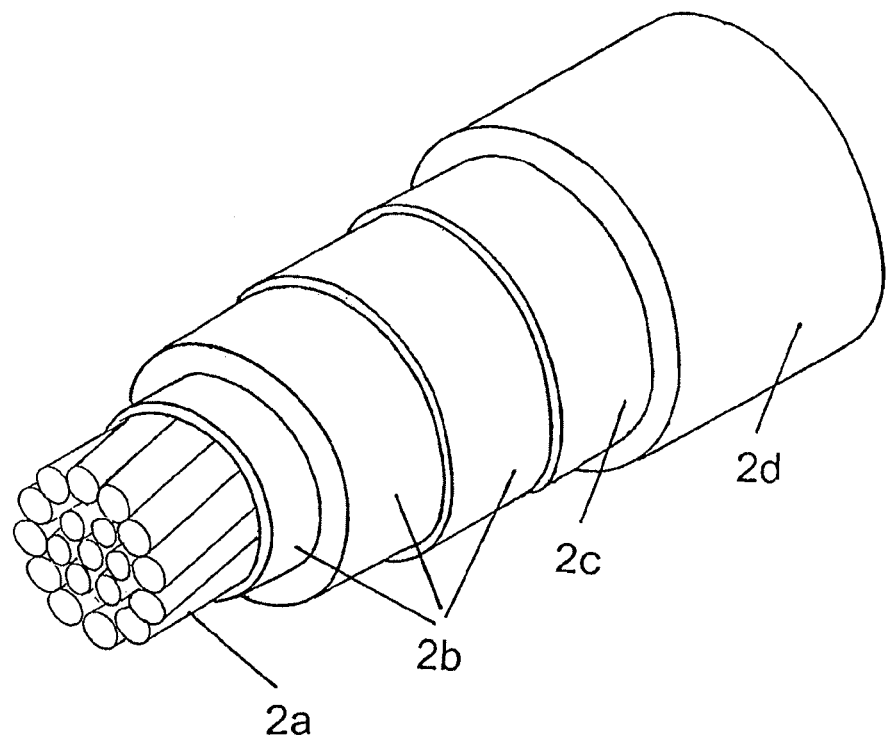

FIG. 1 provides an example of a typical power cable. From inside to outside, it comprises a central copper conductor 2a, semi-conductor and electrical insulation layers 2b, a metallic foil screen 2c and an external polymeric sheath 2d. The central conductor 2a has generally a stranded construction and a large section typically higher than 16 mm$^2$ and generally comprised between 50 mm$^2$ and 400 mm$^2$. Three phase power is provided by three such cables bundled together within the umbilical structure.

Figure 2A:
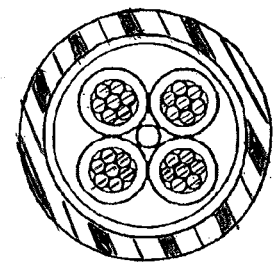
FIG. 2 is a perspective view and FIG. 2a is an end view of a known signal cable.
Figure 2:
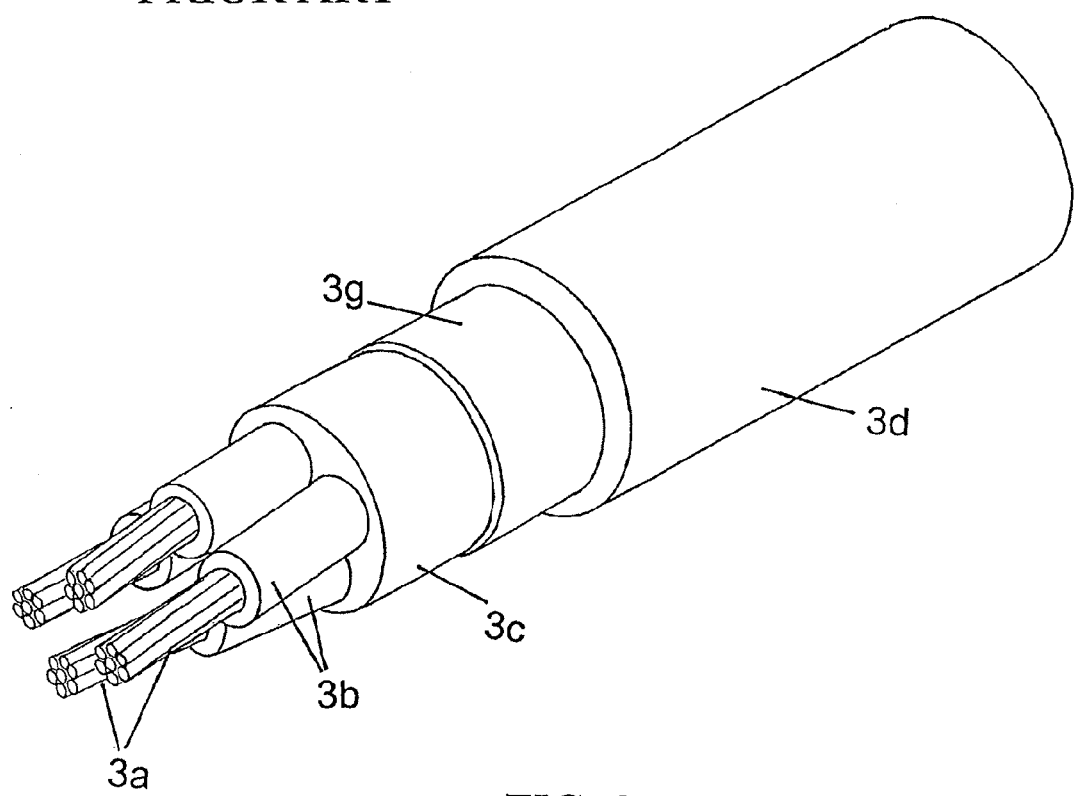

Signal cables generally comprise small section insulated conductors bundled together as pairs (2), quads (4) or, very rarely, any other number, said bundle being further over-sheathed. An example of quad signal cable is illustrated in FIG. 2.

Figure 3:
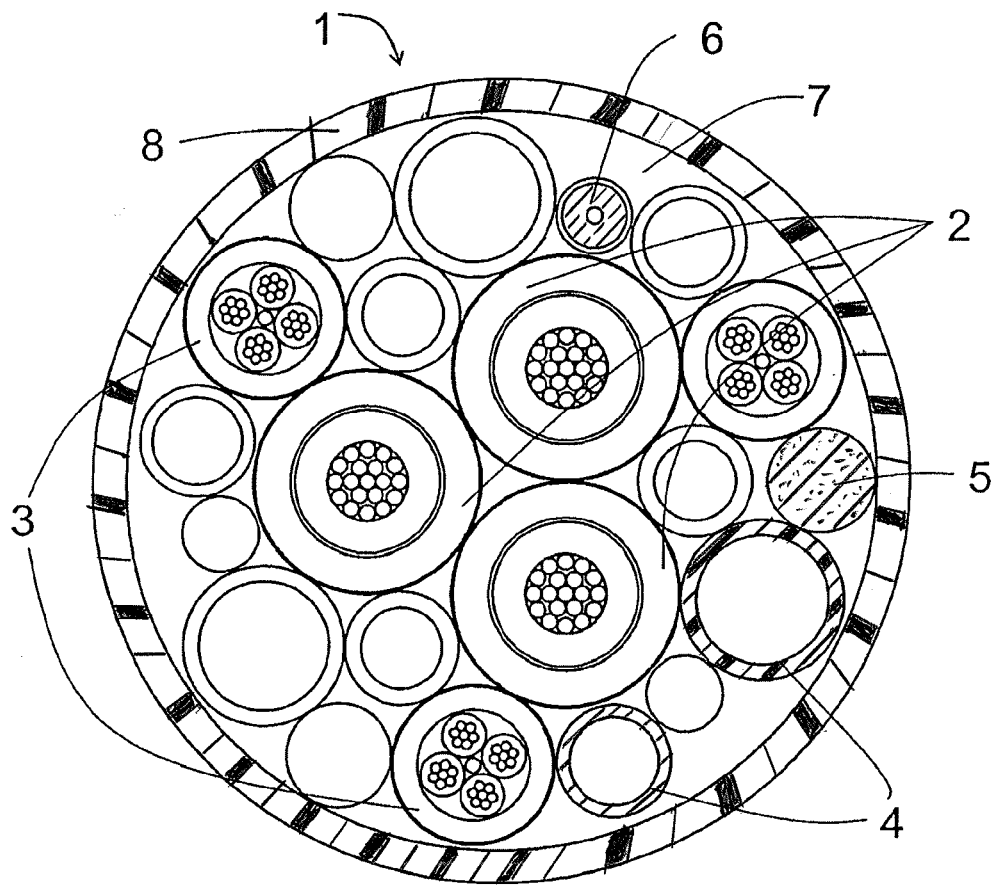
FIG. 3 is a cross-sectional view of an example of an umbilical.

An umbilical comprising at least an electrical power cable is called a power umbilical. An example of a power umbilical cross section is illustrated in FIG. 3. This power umbilical 1 comprises an assembly of functional elements including steel pipes or thermoplastic hoses 4, optical fiber cables 6, reinforcing steel, steel wire ropes or carbon rods 5, electrical power cables 2, and electrical signal cables 3 bundled together with filler material 7 and over sheathed by a polymeric external sheath 8. In this example, the three power cables 2 are bundled together close to the central axis of the umbilical. However, in some cases they may be positioned towards the outside of the umbilical bundle.

Although not represented in the example of FIG. 3, an umbilical may also comprises additional layers of helically wound steel armors such as those disclosed in U.S. Pat. No. 6,472,614. Such an umbilical is called an armored umbilical.

Figure 4:
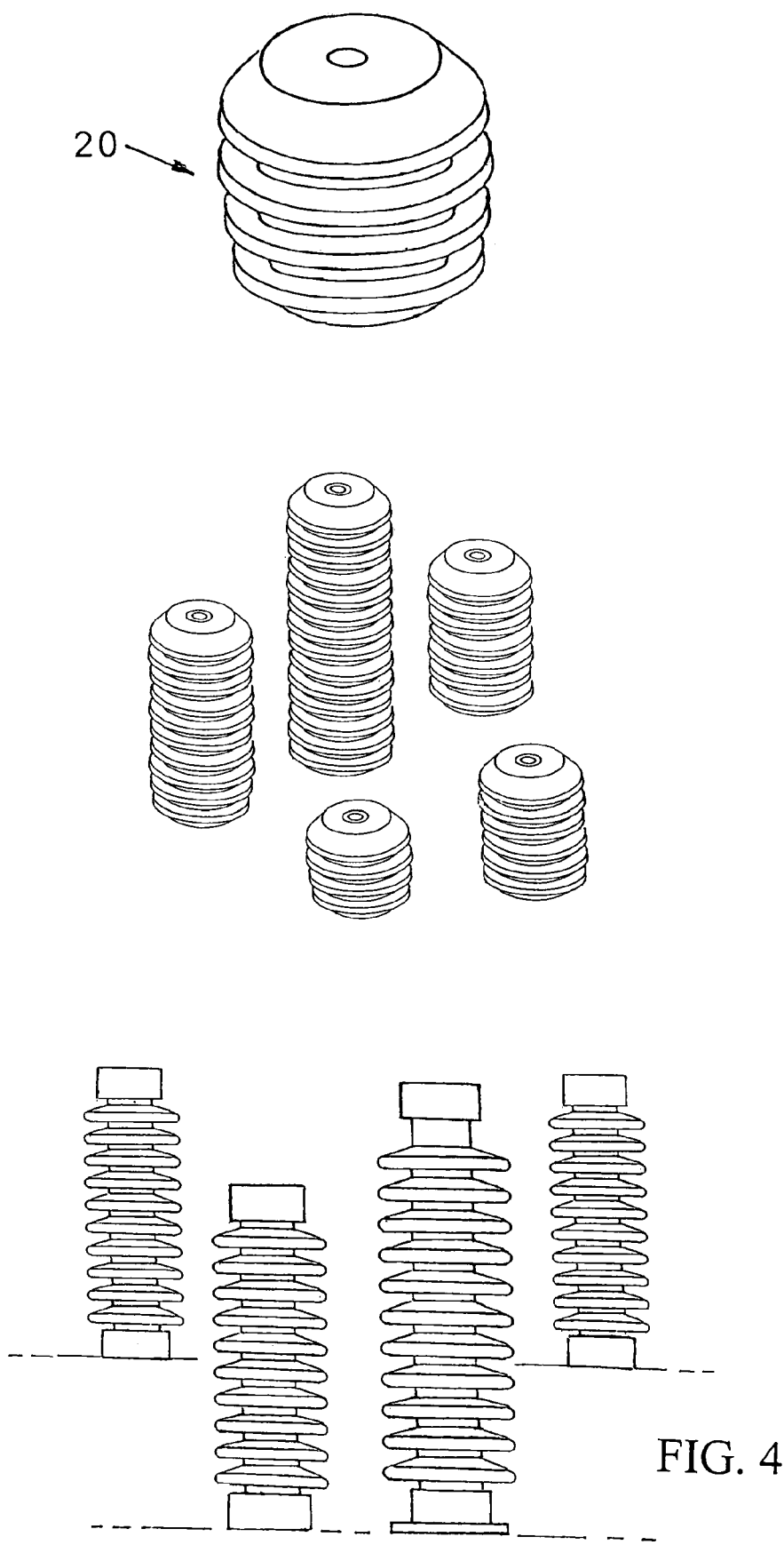
FIG. 4 shows examples of ferrules which are used for the present invention.

Examples of ferrules 20 suitable for the present invention are illustrated in FIG. 4. The illustrated ferrules differ as to their respective lengths.

The special ferrule is pre-fabricated to such an extent that only field splicing/coating will be required to establish the final full insulation properties, i.e. it will be a metallic base coated with insulating material that is applied in a laboratory or factory process. The metallic base of the ferrule has preferably a tubular geometry and is directly fixed around and onto the conductor by crimping, swaging, welding, soldering, brazing. The insulation layer of the ferrule is a preferably a thick tubular layer strongly attached around the metallic base and made of high strength, high insulating materials such as glass, ceramic and PEEK. The first function of this insulation layer is to guarantee a safe electrical insulation between the conductor and the steel termination body. Indeed, the power cable insulation has to be locally removed before mounting the ferrule. Furthermore, the epoxy resin which is cast in the termination may contain moisture and may not be insulating enough especially for high voltage applications. The integrated insulation layer of the ferrule solves these problems and provides a safe insulation in the connection area. The second function of this insulating layer is to transmit mechanical stresses withstood by the conductor from the metallic base to the resin of the termination into which it is anchored, which is the reason why this insulation layer has to be made with high strength materials and has to be strongly fixed to the metallic base.

Ideally the cast resin 'pot' containing the connection ferrule, will be positioned and mechanically connected outboard of the primary umbilical termination. The resin pot may contain a single insulated conductor or combination of one or more cables or cores. Each resin casting will be electrically isolated from the metal secondary support housing.

Figure 5:
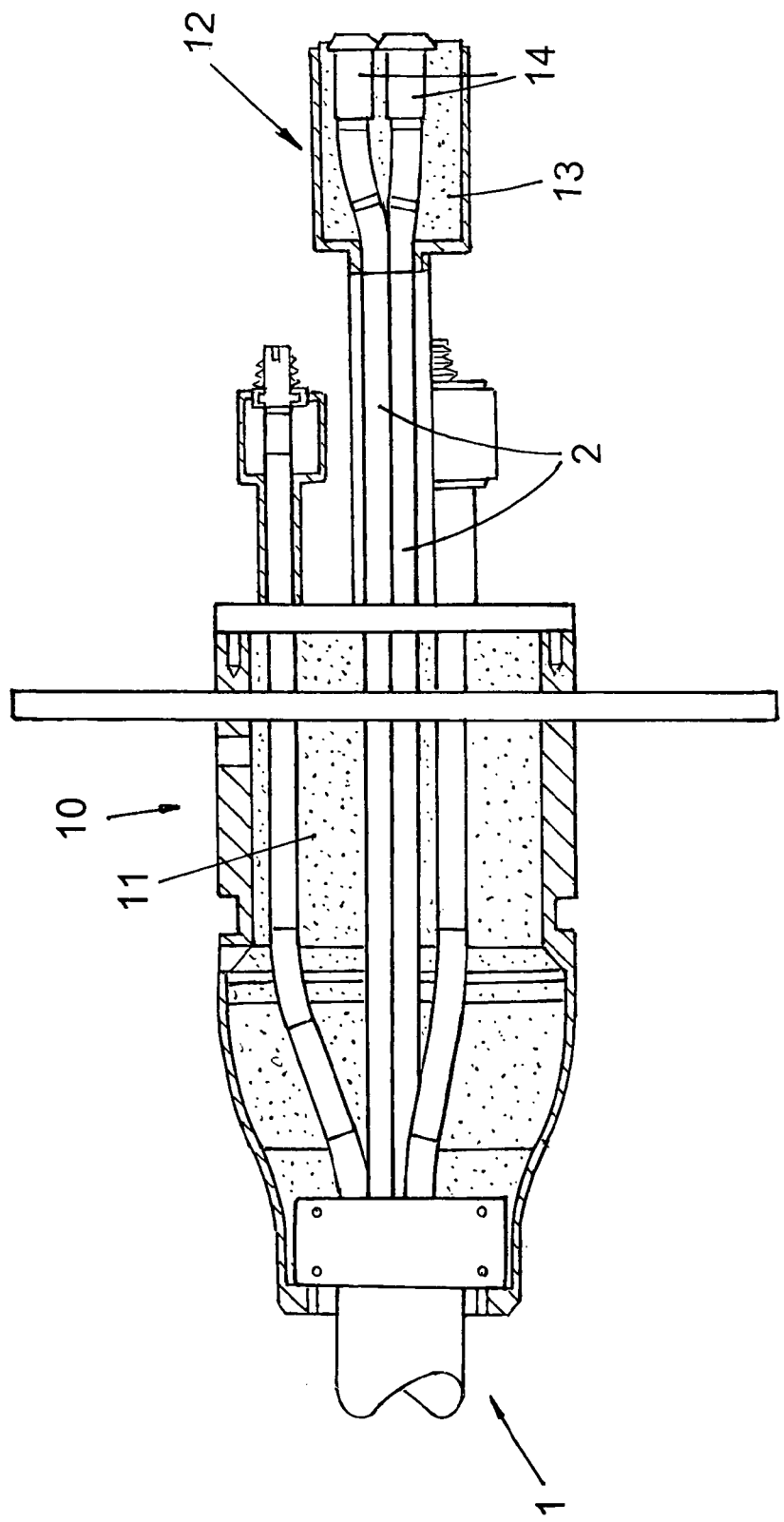
FIG. 5 is a side cross-sectional view of a termination according to the invention.
Figure 6:
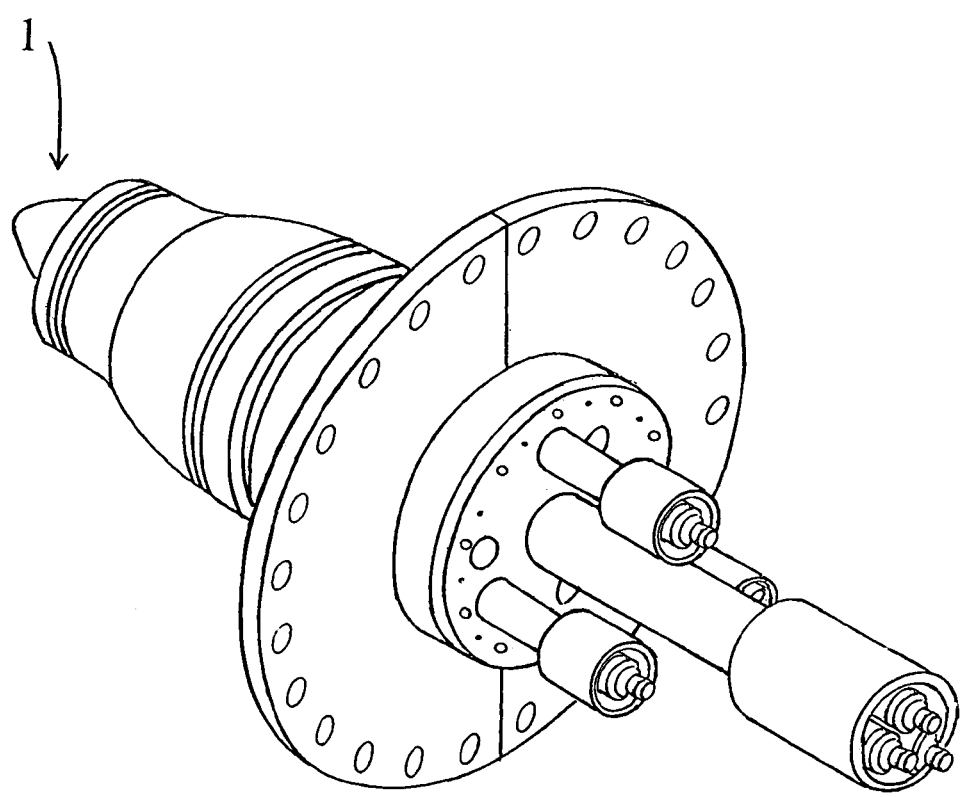
FIG. 6 is a perspective view of the termination.

An example of an umbilical hang-off termination according to the present invention is illustrated in FIG. 5. The primary hang-off termination 10 of the umbilical 1 includes the termination of steel tubes, steel armors and/or other tensile strength elements. Those elements are anchored within the primary hang-off termination according to well-know prior art solutions. The primary hang-off termination may be filled with a hard setting compound, such as an epoxy resin, as disclosed in WO08037962.

The power cables 2 extend through the primary hang-off termination 10 without being fully anchored to it. The upper end of each core of each power cable 2 is fully anchored to a here shown secondary hang-off termination 12. Each power cable core is strongly attached to a respective special ferrule 14. The ferrules 14 are anchored in the secondary termination 12 via a chamber 13 filled with a hard setting compound such as a resin.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An umbilical comprising
   at least one electrical power cable enclosed in an enclosure surrounding and defining the umbilical, each power cable comprises a high tensile strength electrical conductor which is comprised of such material and has such a cross-section that each cable is operable to transmit electrical power therealong and is also of sufficient strength to partially withstand tensile load applied to the umbilical; and
   a hang-off termination of the umbilical positioned and configured to be operable to connect the umbilical to an installation, wherein the hang-off termination is of sufficient strength to withstand tensile load applied to the umbilical and applied to the hang-off termination, wherein the hang-off termination comprises a primary hang-off termination, and each electrical power cable extends through the primary hang-off termination without being fully anchored to it,
   wherein the power cable has a voltage rating falling in the range 6 kV to 35 kV.

2. The umbilical of claim 1, further comprising a plurality of the power cables in the umbilical and enclosed within the covering of the umbilical and each connected to the hang-off termination.

3. The umbilical of claim 1, wherein the hang-off termination comprises a respective ferrule on each of the power cables, the ferrule extending around the respective power cable and the ferrule being operable to provide a support system for the respective conductor.

4. The umbilical of claim 3, wherein the ferrule is comprised of a resin conglomerate with high compressive strength and cord electrical insulating properties; each conductor that receives a respective ferrule is insulated and the ferrule with insulating properties is applied to an exterior of the respective conductor.

5. The umbilical of claim 4, further comprising a plurality of the power cables in the umbilical and enclosed within the covering of the umbilical and each connected to the hang-off termination.

6. The umbilical of claim 5, further comprising additional elements within and extending through the umbilical, the elements being selected from the group consisting of electrical cables, optical cables, optical fiber cables, pipes, and hoses.

7. The umbilical of claim 6, wherein the elements extending through and along the umbilical are bundled together; filler material is around the bundled together elements, and an external sheath is disposed over the filler material and the bundled together elements.

8. The umbilical of claim 1, further comprising an end of each electrical power cable extending through the hang-off termination, and the hang-off termination further comprising a secondary hang-off termination, in which the end of each electrical power cable is anchored.

9. The umbilical of claim 8, wherein the secondary hang off termination comprises a number of support housings different than the number of electrical power cables.

10. The umbilical of claim 1, further comprising a respective ferrule on each of the power cables, the ferrule extending around the respective power cable and the ferrule being operable to provide a support system for the respective conductor.

11. The umbilical of claim 1, wherein the high strength electrical conductor is comprised of a high strength aluminum alloy.

12. The umbilical of claim 1, wherein a cross-section of the high strength electrical conductor is in the range 50 mm$^2$ to 400 mm$^2$.

* * * * *